United States Patent
Olson (10) Patent No.: US 8,436,541 B2
(45) Date of Patent: May 7, 2013

(54) OCCUPANCY SENSOR WITH MULTI-LEVEL SIGNALING

(75) Inventor: James V. Olson, Indianapolis, IN (US)

(73) Assignee: Schneider Electric USA, Inc., Palatine, IL (US)

( * ) Notice: Subject to any disclaimer, the term of this patent is extended or adjusted under 35 U.S.C. 154(b) by 308 days.

(21) Appl. No.: 12/981,965

(22) Filed: Dec. 30, 2010

(65) Prior Publication Data

US 2012/0169242 A1    Jul. 5, 2012

(51) Int. Cl.
*H05B 37/00* (2006.01)

(52) U.S. Cl.
USPC ............... 315/149; 315/158; 315/159

(58) Field of Classification Search ........ 307/112, 307/116, 117, 125, 126, 139, 140; 362/276; 340/540, 555; 315/159, 362, 360, 158, 312, 315/149, 152, 151, 153, 154
See application file for complete search history.

(56) References Cited

U.S. PATENT DOCUMENTS

| | | | |
|---|---|---|---|
| 4,461,977 A | 7/1984 | Pierpoint et al. | |
| 4,661,720 A | 4/1987 | Cameron, Jr. et al. | |
| 4,703,171 A | 10/1987 | Kahl et al. | |
| 5,101,141 A | 3/1992 | Warner et al. | |
| 5,327,048 A * | 7/1994 | Troy ............... | 315/240 |
| 5,699,243 A | 12/1997 | Eckel et al. | |
| 5,714,847 A * | 2/1998 | Lindauer et al. ........ | 315/307 |
| 5,764,146 A | 6/1998 | Baldwin et al. | |
| 5,786,644 A | 7/1998 | Zaretsky | |
| 5,962,989 A | 10/1999 | Baker | |
| 5,971,597 A | 10/1999 | Baldwin et al. | |
| 6,166,640 A | 12/2000 | Nishihira et al. | |
| 6,263,260 B1 | 7/2001 | Bodmer et al. | |
| 6,340,864 B1 | 1/2002 | Wacyk | |
| 6,388,399 B1 | 5/2002 | Eckel et al. | |
| 6,404,079 B1 | 6/2002 | Hsieh | |
| 6,415,205 B1 | 7/2002 | Myron et al. | |
| 6,466,826 B1 | 10/2002 | Nishihira et al. | |
| 6,759,954 B1 | 7/2004 | Myron et al. | |
| 6,791,458 B2 | 9/2004 | Baldwin | |
| 6,841,945 B1 | 1/2005 | Elwell | |
| 6,888,431 B2 | 5/2005 | Jordan | |
| 6,909,668 B2 | 6/2005 | Baldwin et al. | |
| 6,909,921 B1 | 6/2005 | Bilger | |
| 7,027,355 B2 | 4/2006 | Baldwin et al. | |
| 7,122,976 B1 | 10/2006 | Null et al. | |
| 7,411,489 B1 | 8/2008 | Elwell et al. | |
| 7,432,690 B2 | 10/2008 | Williams et al. | |
| 7,486,193 B2 | 2/2009 | Elwell | |
| 7,490,960 B1 | 2/2009 | Fiorino et al. | |
| 7,511,613 B2 | 3/2009 | Wang | |

(Continued)

FOREIGN PATENT DOCUMENTS

| | | |
|---|---|---|
| EP | 343226 B1 | 5/1995 |
| EP | 613328 B1 | 5/2000 |

(Continued)

*Primary Examiner* — David H Vu
(74) *Attorney, Agent, or Firm* — Lando & Anastasi, LLP (57) ABSTRACT

A lighting control system includes a power pack and an enhanced occupancy sensor configured to implement multi-valued signaling to encode additional information into the occupancy signal it provides on the signal line. The power pack is configured to monitor the signal line to detect and interpret the additional information. In one example, the lighting control system also includes a manual override switch coupled to the signal line and/or to the occupancy sensor.

25 Claims, 7 Drawing Sheets

U.S. PATENT DOCUMENTS

| | | |
|---|---|---|
| 7,541,924 B2 | 6/2009 | Elwell |
| 7,554,437 B2 | 6/2009 | Axelsen |
| 7,765,033 B2 | 7/2010 | Perry |
| 7,791,282 B2 | 9/2010 | Yu et al. |
| 2002/0175815 A1 | 11/2002 | Baldwin |
| 2005/0077840 A1 | 4/2005 | Kazanov et al. |
| 2007/0216313 A1 | 9/2007 | Soccoli et al. |
| 2007/0273307 A1 | 11/2007 | Westrick et al. |
| 2008/0079568 A1 | 4/2008 | Primous et al. |
| 2008/0092075 A1 | 4/2008 | Jacob et al. |
| 2009/0058193 A1 | 3/2009 | Reid et al. |
| 2009/0115385 A1 | 5/2009 | Williams et al. |
| 2010/0134051 A1* | 6/2010 | Huizenga et al. ............ 315/362 |
| 2010/0207532 A1 | 8/2010 | Mans |

FOREIGN PATENT DOCUMENTS

| | | |
|---|---|---|
| EP | 940061 B1 | 7/2006 |
| WO | 9960354 A1 | 11/1999 |
| WO | 2009137041 A1 | 11/2009 |
| WO | 2010102026 A2 | 9/2010 |

* cited by examiner

OCCUPANCY SENSOR WITH MULTI-LEVEL SIGNALING

BACKGROUND

1. Field of the Invention

The present invention relates generally to lighting control systems and, more particularly, to lighting control systems using zones with multiple occupancy sensors.

2. Discussion of Related Art

Lighting control systems employ sensors and controllers to automatically and selectively power light fixtures on and off, thereby providing light where and when it is needed and reducing lighting in unoccupied areas to achieve energy and cost savings. Many lighting control systems employ occupancy sensors to conserve energy by activating and deactivating light fixtures automatically, depending upon occupancy of areas. Occupancy sensors typically provide a stationary signal (i.e., constant voltage or current level for a predetermined time period) representing occupancy, which is derived from an occurrence of movement. Since an occupant is generally not continuously in motion, a time delay is added to an occurrence of movement to create a period of occupancy. This period of occupancy is assumed to represent an occupied area, such that the light fixtures in that area are activated and held on for as long as the area is occupied. The time delay that is used to create the period of occupancy is a preset time interval that is typically between three and thirty minutes in duration.

Figure 1:
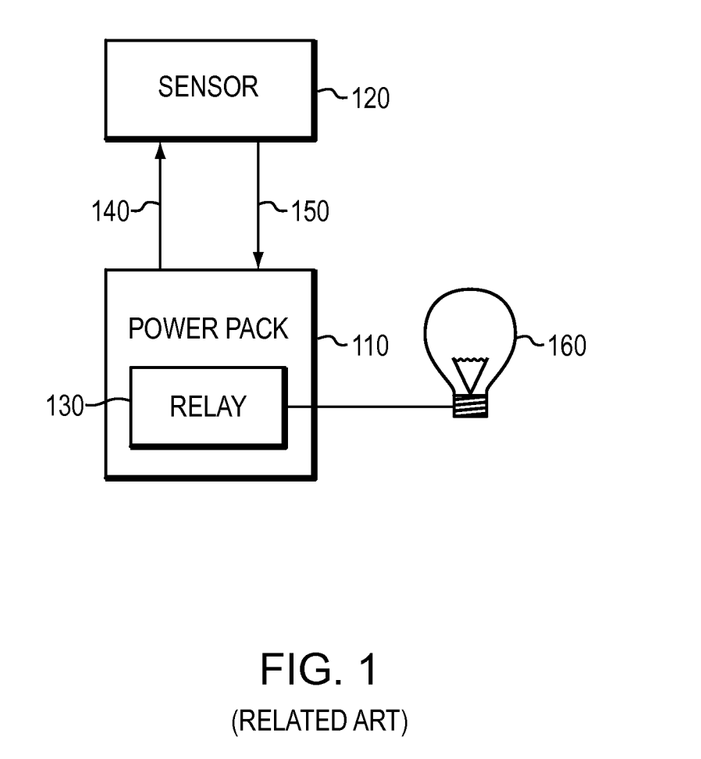
FIG. 1 is a block diagram of a conventional occupancy sensor and power pack combination.

Referring to FIG. 1, occupancy sensor devices in a conventional lighting control system are often split into two components, namely, a power pack 110 and an occupancy sensor 120. The sensor 120 receives operating power (on line 140) from the power pack 110 and provides an occupancy signal (on signal line 150) to the power pack 110, the occupancy signal representing occupancy of a monitored area. The occupancy signal on signal line 150 is used by the power pack 110 to control an internal relay 130. The relay 130 closes in response to the occupancy signal to activate a lighting fixture 160 connected through the relay 130.

There are several different types of occupancy sensors used by current lighting control systems, including, for example, passive infrared ("PIR") sensors and ultrasonic sensors. PIR sensors activate lighting fixtures whenever a moving or additional heat source is detected. Ultrasonic sensors emit ultrasonic vibrations at frequencies of 25 kHz or higher and listen to the return of echoes. If a significant Doppler shift is detected, the ultrasonic sensor indicates a high probability that there is movement in the area. Ultrasonic sensor technology allows continuous detection of moving objects that reflect ultrasonic acoustic energy. The lighting fixtures are then activated in response to the detected movement.

SUMMARY OF INVENTION

The conventional occupancy sensor and power pack combination discussed above with reference to FIG. 1 provides a simple, basic level of energy management of lighting loads; however, the energy management capability is limited, in particular due to the singular purpose of the occupancy signal line 150 and limited functionality of the power pack 110. Therefore, a need exists for a power pack and occupancy sensor combination that can provide a higher level of energy management, while preferably also being easy to use, simple to install, and cost effective.

Accordingly, aspects and embodiments of the present invention are directed to a lighting control system which includes an occupancy sensor configured for multi-level signaling, and a power pack configured to listen for and interpret the multi-level signaling, allowing for more sophisticated and/or accurate lighting control and energy management capability. In one embodiment, the occupancy sensor provides additional information, such as information regarding movement detected in the monitored area, encoded into an occupancy signal, and thus provides a tri-level signal conveying both occupancy and movement information. A specialty power pack according to embodiments of the present invention is configured to detect and respond to the encoded information, thereby providing enhanced functionality to the lighting control system, as discussed further below. In addition, embodiments of a lighting control system are configured to accommodate a manual override switch to allow an occupant to control lighting within an area. Multi-level signaling is further used to provide override commands from the manual override switch to the power pack on the same signal line used for occupancy, thereby avoiding the need for the power pack to have a separate signal port or additional wiring, as discussed further below.

According to one embodiment, a lighting control system comprises at least one occupancy sensor configured to provide on a signal line an occupancy signal representative of occupancy of an area, the occupancy signal being a DC voltage signal having a first non-zero voltage level maintained for a first predetermined duration followed by a second, lower, non-zero voltage level maintained for a second predetermined duration. The lighting control system also comprises a power pack coupled to the at least one occupancy sensor and configured to receive the occupancy signal on the signal line, the power pack comprising a load switching device (for example, a relay) configured to be coupled to a lighting circuit, and configured to actuate the load switching device responsive to the occupancy signal. The power pack is further configured to monitor the signal line to detect occurrences of the first non-zero voltage level.

According to another embodiment, a lighting control system comprises a power pack including a relay configured to be coupled to a lighting circuit, wherein actuation of the relay turns the lighting circuit on and off, a signal line coupled to the power pack, and a plurality of occupancy sensors coupled to the signal line, each occupancy sensor configured to provide on the signal line an occupancy signal responsive to detection of movement within an area of coverage of the occupancy sensor. The occupancy signal is a DC voltage signal including a movement portion followed by an occupancy portion, the movement portion being a first non-zero voltage level maintained for a first predetermined duration, and the occupancy portion being a second, lower, non-zero voltage level maintained for a second predetermined duration. The power pack is configured to actuate the relay responsive to receipt of the occupancy signal to turn the lighting circuit on.

In one example, the power pack is configured to monitor the signal line for occurrences of the movement portion and to derive movement information from the movement portion of the occupancy signal from at least some of the plurality of occupancy sensors. In another example, successive instances of the first non-zero voltage together form a movement signal supplied on the signal line by one or more of the occupancy sensors. For example, an occupancy sensor may repeat movement pulses (instances of the first non-zero voltage level) responsive to detected movement during the "dwell time" or second predetermined duration, as discussed further below. In some instances it may be advantageous to have a timer that sets the period of occupancy (referred to as a "dwell timer")

implemented in the power pack, rather than in the occupancy sensor. In this example, the dwell timer may be responsive to the movement portion rather than the occupancy portion of the signal. Thus, the lighting control system may further comprise a timer coupled to the power pack and configured to receive the movement information, or information derived from the movement signal, and to generate a time delay based on this information to set a period of occupancy for the area. In one example, the first non-zero voltage level is at least a rated coil voltage of the relay, and wherein the first predetermined duration is greater than a contact closure time of the relay. The second non-zero voltage level may be higher than a specified coil drop-out voltage of the relay. In another example the power pack is further configured to provide a DC power signal to the occupancy sensors, and one of the first non-zero voltage level and the second non-zero voltage level is approximately a voltage of the DC power signal. In another example, the second non-zero voltage is approximately the voltage of the DC power signal, and the occupancy sensor comprises a capacitor configured to provide the first non-zero voltage level. The first non-zero voltage level may be, for example, approximately +24 Vdc or +30 Vdc. The second non-zero voltage level may be, for example, approximately +18 Vdc or +24 Vdc. The first predetermined duration may be, for example, approximately 100 milliseconds.

In another example, the system includes a first occupancy sensor and a manually-operable switch coupled to the first occupancy sensor and configured to provide a switch signal to the first occupancy sensor responsive to actuation of the switch. The first occupancy sensor may be further configured to provide on the signal line an override signal corresponding to the switch signal, wherein the override signal comprises at least one pulse of a third non-zero voltage level, the third non-zero voltage level being higher than the first non-zero voltage level. In one example, the first non-zero voltage level is approximately +24 Vdc and the third non-zero voltage level is approximately +30 Vdc. The power pack may be configured to actuate the relay responsive to the override signal. In another example, the lighting control system further comprises a manually-operable switch coupled to the signal line and configured to provide on the signal line an override signal responsive to actuation of the switch, the override signal comprising at least one pulse of a third non-zero voltage level, the third non-zero voltage level being higher than the first non-zero voltage level. The first non-zero voltage level may be, for example, approximately +24 Vdc and the third non-zero voltage level may be, for example, approximately +30 Vdc. The occupancy sensor(s) may be, for example, passive infrared sensors or ultrasonic sensors.

Another embodiment is directed to a method of controlling a lighting circuit comprising acts of receiving on a signal line an occupancy signal representative of an occupancy status of an area, the occupancy signal including a first non-zero voltage level and a second non-zero voltage level, the first non-zero voltage level being higher than the second non-zero voltage level, monitoring the signal line to detect subsequent occurrences of the first non-zero voltage level, deriving movement information from detected occurrences of the first non-zero voltage level, and controlling the lighting circuit responsive to at least one of the occupancy signal and the movement information. In one example of the method, controlling the lighting circuit includes actuating a relay or other load switching device to turn the lighting circuit on.

According to another embodiment, a lighting control system comprises an occupancy sensor configured to provide on a signal line an occupancy signal representative of occupancy of an area, the occupancy signal being a DC voltage signal having a first non-zero voltage level maintained for a first predetermined duration followed by a second non-zero voltage level maintained for a second predetermined duration, the first non-zero voltage level being higher than the second non-zero voltage level. The lighting control system further comprises a manually-operable switch coupled to the signal line and configured to provide on the signal line an override signal responsive to actuation of the switch, the override signal including at least one pulse of a third non-zero voltage level, the third non-zero voltage level being higher than the first non-zero voltage level, and a power pack coupled to the occupancy sensor and the signal line and configured to receive the occupancy signal and the override signal on the signal line, the power pack including a load switching device (for example, a relay) configured to be coupled to a lighting circuit, and the power pack being configured to actuate the load switching device responsive to at least one of the occupancy signal and the override signal.

In one example, the power pack is configured to provide DC power to the occupancy sensor, the DC power having a power voltage level, and the first non-zero voltage level is substantially equal to the power voltage level. In this example, the second non-zero voltage level may be higher than a specified coil drop-out voltage of the relay. In one example, the power voltage level is approximately +24 Vdc, the second non-zero voltage level is approximately +18 Vdc, and the third non-zero voltage level is approximately +30 Vdc. In another example, the lighting control system further comprises at least one additional occupancy sensor coupled to the signal line and to the power pack and configured to provide the occupancy signal on the signal line. Successive instances of the first non-zero voltage together may form a movement signal, wherein the power pack is configured to monitor the signal line to detect the movement signal. The lighting control system may further comprise a timer coupled to the power pack and configured to receive information derived from the movement signal and to generate a time delay based on the information to set a period of occupancy for the area.

According to another embodiment, a lighting control system comprises an occupancy sensor configured to provide on a signal line an occupancy signal representative of occupancy of an area, the occupancy signal being a DC voltage signal having a first non-zero voltage level maintained for a first predetermined duration followed by a second non-zero voltage level maintained for a second predetermined duration, the first non-zero voltage level being higher than the second non-zero voltage level. The lighting control system further comprises a manually-operable switch coupled to the occupancy sensor and configured to provide a switch signal to the occupancy sensor responsive to actuation of the switch, and a power pack coupled to the occupancy sensor and the signal line, the power pack including a load switching device configured to be coupled to a lighting circuit. The occupancy sensor is configured to detect the override signal and to provide on the signal line an override signal responsive to the switch signal, the override signal including at least one pulse of a third non-zero voltage level, the third non-zero voltage level being higher than the first non-zero voltage level, and the power pack is configured to receive the occupancy signal and the override signal on the signal line and to actuate the load switching device responsive to at least one of the occupancy signal and the override signal.

Another embodiment is directed to a method of controlling a lighting circuit comprising acts of receiving on a signal line an occupancy signal representative of an occupancy status of an area, the occupancy signal including a first non-zero voltage level and a second non-zero voltage level, the first non-zero voltage level being higher than the second non-zero voltage level, receiving on the signal line an override signal from a manually operable switch, the override signal including at least one pulse of a third non-zero voltage level higher than the first non-zero voltage level, and controlling the lighting circuit responsive to at least one of the occupancy signal and the override signal.

In one example, controlling the lighting circuit includes actuating a relay to turn on the lighting circuit responsive to the occupancy signal indicating that the occupancy status of the area is occupied. In another example, controlling the lighting circuit includes actuating a relay to turn on the lighting circuit responsive to the override signal including one pulse. In another example, controlling the lighting circuit includes actuating a relay to turn off the lighting circuit responsive to the override signal including two pulses.

According to another embodiment, an occupancy sensor comprises a sensor configured to detect movement in a monitored area, a signal output coupled to the sensor, and control circuitry configured to produce at the signal output an occupancy signal indicating that the monitored area is occupied responsive to a first instance of detected movement in the monitored area, the occupancy signal being a DC voltage signal having a first non-zero voltage level maintained for a first predetermined duration followed by a second non-zero voltage level maintained for a second predetermined duration, the first non-zero voltage level being higher than the second non-zero voltage level.

In one example, the first non-zero voltage level is approximately +24 Vdc and the second non-zero voltage level is approximately +18 Vdc. In another example, the second non-zero voltage level is approximately +24 Vdc and the first non-zero voltage level is approximately +30 Vdc. The occupancy sensor may further comprise a switch input configured to receive a switch signal. In this example, the occupancy sensor is further configured to provide at the signal output an override signal responsive to the switch signal, the override signal including at least one pulse of a third non-zero voltage level, the third non-zero voltage level being higher than the first non-zero voltage level. The third non-zero voltage level may be, for example, approximately +30 Vdc. Thus, in one example of a multi-level signaling scheme, three different non-zero voltage levels are used to convey movement, occupancy and override information, and zero voltage on the signal line indicates the unoccupied stated of the monitored area. The occupancy sensor may further comprise a capacitor configured to generate the third non-zero voltage level.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with at least one of the objectives, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description, or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

DETAILED DESCRIPTION

The occupancy sensor and power pack combination discussed above with reference to FIG. 1 provides a simple and effective solution to energy savings; however, the solution is limited due to the singular purpose of the signal line 140 and limited functionality of the power pack 110. Commonly-owned related U.S. patent application Ser. No. 12/645,626 titled "Networked Occupancy Sensor and Power Pack" filed Dec. 23, 2009, and Ser. No. 12/645,674 titled "Occupancy Sensor With Embedded Signaling Capability" filed Dec. 23, 2009 describe a method of inserting additional information into the stationary output of the occupancy sensor to enhance the functionality of the lighting control system. The occupancy sensor generally signals the power pack with a constant or steady DC voltage (for example +24 Vdc) signal initiated by an instance of movement; hence the term "stationary output" refers to this generally constant signal. A +24 Vdc level on the signal line 150 instructs the power pack 110 to actuate the relay 130 to turn on the attached lighting load(s) for a pre-set period of occupancy, and 0 Vdc on the signal line 150 instructs the power pack 110 to turn off the lighting load(s). This is referred to herein as the "legacy" signaling method.

Commonly-owned related U.S. patent application Ser. Nos. 12/645,626 and 12/645,674 describe an enhanced occupancy sensor that is configured to provide additional information, such as a movement signal, in the form of a short-duration/high frequency signal that is superimposed onto the stationary output of the occupancy sensor. Specifically, U.S. patent application Ser. Nos. 12/645,626 and 12/645,674 describe that instances of movement, after an initial movement that triggers the occupancy signal, are indicated by a momentary drop on the signal line to 0V followed by a rise again to +24 Vdc. The predominantly constant +24 Vdc signal constitutes the occupancy signal, and the momentary drops to 0V, followed by rises returning the signal to +24 Vdc, constitute the superimposed movement signal, with each drop followed by a rise indicating an instance of movement. The momentary drops to 0 Vdc are sufficiently short so as not to trigger the power pack to turn off the lighting load 160. This signaling method allows the enhanced occupancy sensor to supply additional information to a suitably configured power pack; however, the method is limited in that it is suitable only for single occupancy sensor systems due to the need to avoid signal bus contention and preserve existing occupancy sensor hardware designs.

As discussed above, as long as an occupancy sensor 120 holds the signal line 150 at +24 Vdc, the attached lighting load 160 remains on. At the conclusion of the preset period of occupancy, the occupancy sensor 120 drops the signal line 150 to 0 Vdc and the power pack 110 turns off the load 160. Many lighting control systems achieve wide sensor coverage by using multiple occupancy sensors that share the same signal line and power pack. In such systems, if any occupancy sensor sees motion, the signal line is held at +24 Vdc, turning the lighting load on. This binary, non-addressable signaling method hides from the power pack the identity of the occupancy sensor that observes the motion, and causes the use of the signaling method described in U.S. patent application Ser. Nos. 12/645,626 and 12/645,674 to fail if two or more sensors share the same signal line. This results because one sensor's assertion of a long-duration occupancy signal at +24 Vdc preempts the momentary drops to 0 Vdc inserted by another sensor to indicate movement. In other words, once a first occupancy sensor is holding the signal line at +24 Vdc (or another specified voltage level), a second occupancy sensor is unable to cause the signal line to drop to 0V, and the superimposed movement signal is therefore lost. As a result, systems implementing the signaling method described in U.S. patent application Ser. Nos. 12/645,626 and 12/645,674 allocate only one occupancy sensor to each input port (and signal line) of the specialty power pack.

As discussed above, many lighting control systems use multiple occupancy sensors that share the same signal line and power pack, and therefore a need exists for a power pack and occupancy sensor combination that can provide additional information for more advanced lighting control in such systems. Accordingly, aspects and embodiments are directed to lighting control systems and methods that transition from the conventional binary signaling scheme to a multi-valued signaling architecture, for example, a three-valued signaling architecture, to allow multiple occupancy sensors coupled to the same signal line to provide information to the power pack. In one example of a three-valued signaling scheme, two of the three signal values are 0 Vdc and approximately +24 Vdc, thereby preserving the architecture of legacy power packs. The third signaling value, used to convey additional information beyond occupancy status of the monitored area (e.g., observed motion) to the power pack is a voltage that deviates slightly and briefly from the +24 Vdc level, as discussed further below.

It is to be appreciated that embodiments of the methods and apparatus discussed herein are not limited in application to the details of construction and the arrangement of components set forth in the following description or illustrated in the accompanying figures. The methods and apparatus are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 2:
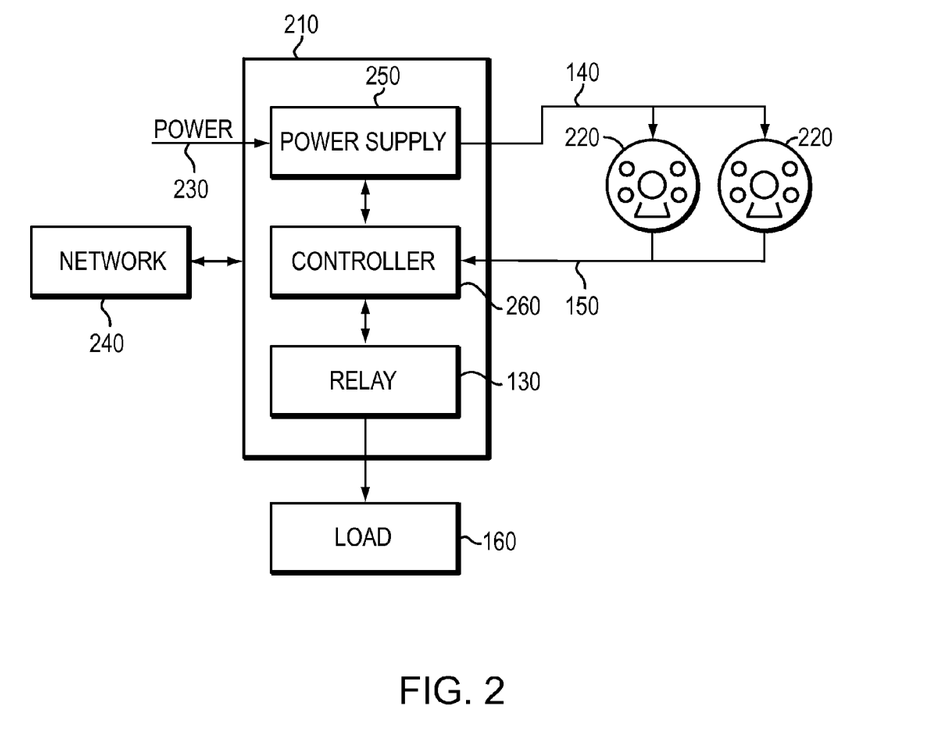
FIG. 2 is a block diagram of one example of a lighting control system including an occupancy sensor and power pack, according to aspects of the invention.

Referring to FIG. 2, there is illustrated a block diagram of one example of a lighting control system including a power pack 210 coupled to a plurality of occupancy sensors 220. The occupancy sensors 220 may be passive infrared sensors, ultrasonic sensors, or dual infrared-ultrasonic sensors, for example. Each occupancy sensor 220 provides an occupancy signal to the power pack 210 on signal line 150, as discussed further below. The power pack 210 provides power to the occupancy sensors 220 via supply line 140. Accordingly, the power pack 210 includes a power supply 250. The power provided by the power pack 210 may typically be DC (direct current) supply voltage, for example, +24 Vdc, which may be provided via any suitable wiring connection, including, for example, a low voltage/low current three-wire or two-wire circuit, or an RJ-type connector and wiring. Thus, although supply line 140 is illustrated as a single line, it is to be appreciated that supply line 140 may represent multiple physical wiring lines. The power pack 210 may itself receive power from an external source via power line 230. Again, it is to be appreciated that the power line 230 may represent multiple physical lines depending, for example, on the type of wiring used.

The power pack 210 controls a load 160, which may include one or more lighting circuits, via one or more internal relays 130 responsive to the signal received from the occupancy sensor 220. It is to be appreciated that the relay 130 may be replaced with another load switching device, such as, for example, silicon controlled rectifiers (SCRs), Triacs, transistors, or other electrical load switching devices. In another embodiment, the power pack 210 may include, or may be connected to, a second relay 450 (not shown) to allow bi-level lighting control. In another example, the power pack 210 may provide a variable current output through the relay 130, for example, 4-20 mA, thereby allowing dimming control of a load 160 with appropriate ballast. In other embodiments, the power pack may be replaced with a relay module, also referred to as an auxiliary relay or switch pack, which comprises a relay whose coil is powered by the signal line from the occupancy sensor. It is to be appreciated that although the following discussion will refer primarily to occupancy sensors used with power packs, relay modules may also be used. Either device (power pack or relay module) is configured to switch an AC load, such as the lighting load 160.

The power pack 210 also includes a controller 260 that may be used to decode the signals received on signal line 150 from the occupancy sensors 220, and to control the relay 130, as discussed further below. In some embodiments, the power pack 210 may also be coupled to and communicate with a network 240. For example, the power pack 210 may provide information (derived from the signals received from the occupancy sensors 220, for example) to the network 240 (or to other devices connected to the network) and/or receive information and/or control commands via the network. In one example, the network 240 is a C-Bus™ network used by various control systems available from the Schneider Electric company. "C-Bus" is a trademark of Schneider Electric. Being connectable to the network 240 allows the power pack 210, and associated occupancy sensors, to be used as part of a larger lighting control system thereby enabling enhanced control options such as, for example, overriding the occupancy status for a given power pack as part of a zone-wide control strategy, as discussed in U.S. patent application Ser. No. 12/645,626.

According to one embodiment, each occupancy sensor 220 provides an occupancy signal to the power pack 210 on the signal line 150. As discussed above, conventionally the occupancy sensors implement a binary signaling scheme in which the occupancy signal is a constant level voltage, for example, 24 Volts (+24 Vdc) indicating occupancy of the monitored area, and no voltage (0V) is applied to the signal line 150 when none of the connected occupancy sensors 220 have detected movement. This binary signaling scheme conveys only occupancy status (i.e., occupied or not) of the monitored area to the power pack. By contrast, in one embodiment, the occupancy sensors 220 are configured to implement a multi-level signaling scheme that allows the power pack 210 to be made aware of instances of movement detected by any of the occupancy sensors even when one occupancy sensor is already applying an occupancy signal to the signal line 150. Thus, the power pack 210 can receive additional information, such as a signal representative of movement in the monitored area, in addition to the occupancy status of the monitored area.

Figure 3:
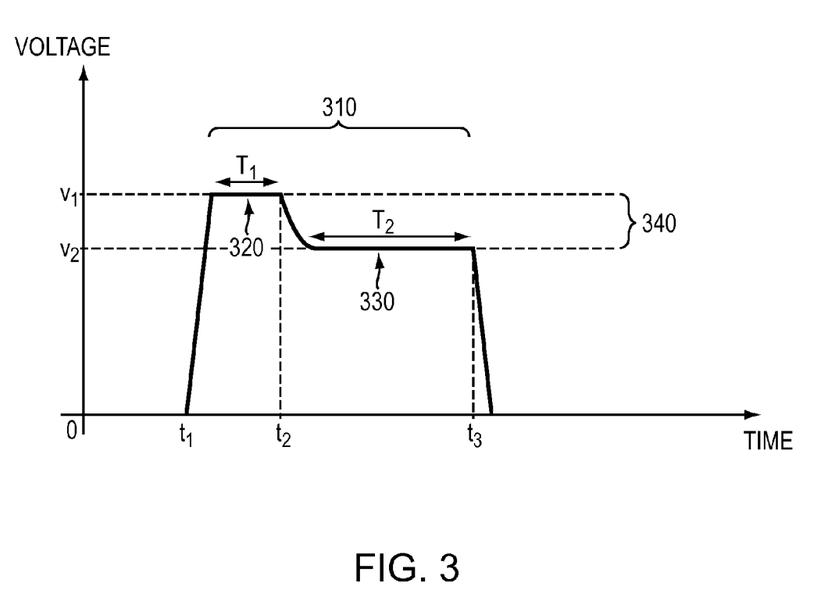
FIG. 3 is a signal diagram illustrating one example of a multi-level occupancy signal, in accordance with aspects of the invention.

Referring to FIG. 3 there is illustrated one example of a three-valued occupancy signal according to one embodiment. When the occupancy sensor 220 detects movement in the monitored area, the occupancy sensor asserts the occupancy signal 310 on the signal line 150. The occupancy signal 310 includes a brief pulse or first portion, referred to herein as the "movement portion" 320 at a first voltage level V1, followed by a sustained "occupancy portion" 330 at a second, lower, voltage level V2. The movement portion 320 has a duration T1 and the occupancy portion 330 has a duration T2. The occupancy portion 330 resembles the conventional occupancy signal, and the movement portion 320 provides movement information to the power pack 210 which is configured to 'listen" for and detect the movement pulses, as discussed further below. The duration T2 of the occupancy portion 330 of the occupancy signal 310 may be determined by a preset time or period of occupancy which may be set, for example, via manual control on the occupancy sensor, by a control signal from the power pack 210, or by a timer in the hardware or software of the sensor. The duration T2 may be, for example, about 2 to 20 minutes. The occupancy sensor 220 may include a time counter to control the duration for which the occupancy signal is applied to the signal line 150.

According to one embodiment, a three-level signaling architecture using the occupancy signal 310 illustrated in FIG. 3 may be implemented according to either of two methods. A first method is referred to herein as "drooping" and another method is referred to as "hiccupping." Both methods preserve zero volts (0 Vdc) as the "unoccupied" state in which the load 160 is turned off. Furthermore, both methods may be implemented with the voltage levels V1 and V2 and the duration T1 selected such that the occupancy sensors remain compatible with conventional power packs and legacy wiring systems, as discussed further below.

According to one embodiment, using the drooping method, the occupancy sensor 220 asserts the supply voltage for the duration T1 and thereafter the signal decays to the second voltage level V2, which is lower than the supply voltage. Thus, in the drooping method, the first voltage level V1 is approximately the supply voltage level. As used herein, the term "supply voltage" refers to the voltage level of the power supplied from the power pack 210 to the occupancy sensors 220 on the supply line 140. The supply voltage may typically be about +24 Vdc, and therefore examples herein may generally refer to a supply voltage of +24 Vdc. However, it is to be appreciated that other voltage levels may be used consistent with appropriate signal levels for various applications and that embodiments of the methods and apparatus discussed herein may be implemented using any of a range of supply voltages, not limited to +24 Vdc. In one example, the duration T1 of the movement pulse is approximately 100 milliseconds (ms). A voltage level of +24 Vdc for 100 ms will activate the relay 130 at the rated coil voltage for a period that exceeds the contact closure time of the relay, thereby ensuring that the load 160 is turned on. Subsequently, the sustained signal level V2 holds the relay armature closed at a voltage exceeding the coil drop-out specification for the preset period of occupancy. In one example, the second voltage level V2 is approximately +18 Vdc; however, it is to be appreciated that the voltage level V2 is not limited to +18 Vdc and may be selected based on a variety of factors, including, for example, the specified coil drop-out voltage of the relay 130, or voltage needed to maintain the load 160 in the on state. It is further to be appreciated that the duration T1 may be selected based, for example, on the type of relay 130 (or other switching mechanism) used in the power pack 210 and is not limited to 100 ms.

Post-droop (i.e., the decay of the occupancy signal to the second voltage level V2), if a second occupancy sensor 220 detects motion, that sensor asserts +24 Vdc (V1) on the signal line 150, followed 100 ms (T2) later by a droop to +18 Vdc (V2). Thus, referring to FIG. 3, instances of movement are encoded in the voltage region 340 above +18 Vdc; in other words, between V2 and V1. Under the droop method, an enhanced power pack 210 configured to detect and extract the movement signal monitors the signal line 150 for 100 ms upward excursions in the signal line voltage level above V2, for example, in the range between about +18 Vdc and +24 Vdc. Thus, the movement information is superimposed on the same signal line 150 used to report the occupancy information to the power pack 210. By appropriately selecting the values of V2 and T1, for example, +18 Vdc and 100 ms as discussed above, compatibility with conventional power packs can be ensured. For example, conventional power packs have active circuitry between the signal line 150 and the relay 130, the active circuitry being immune to the drooping from +24 Vdc to +18 Vdc as it is configured to interpret any voltage above +12 Vdc as a "load on" signal.

According to another embodiment, the "hiccupping" method is a level-translated version of the drooping method. Using the hiccupping method, an instance of detected motion causes the occupancy sensor 220 to assert a brief pulse of the first voltage level V1 for the duration T1 (a "hiccup"), followed by a decay to the supply voltage level. The second voltage level V2 is maintained for the preset period of occupancy, as discussed above. Thus, in the hiccup method, the second voltage V2 is approximately equal to the supply voltage. In one example, the supply voltage is again +24 Vdc, and the first voltage level V1 is approximately +30 Vdc. T1 may again be selected to be about 100 ms. The height and duration of the "hiccup" pulse, i.e. V1 and T1, may be limited by the ability of components of the power pack or relay module, e.g., the relay coil, to tolerate voltages exceeding the supply voltage. For example, a relay module having a +24 Vdc-rated relay coil may suffer overheating of the relay coil if subjected to sustained operation (e.g., for longer than about 5 seconds) at voltages exceeding the relay coil voltage specification. Overheating may occur more quickly if the voltage is significantly greater than the relay coil voltage specification. Accordingly, and to ensure compatibility with conventional power packs, it may be desirable to keep T1 short, for example, a few milliseconds to a few hundred milliseconds, and to have V1 not exceed the supply voltage by more than a few volts. However, V1 should be sufficiently higher than the supply voltage such that minor fluctuations of the voltage level V2 are not misinterpreted by the power pack 210 as instances of movement.

As discussed above, in one embodiment, the occupancy sensor 220 is powered by the power pack 210 and therefore does not have access to a source of voltage higher than the supply voltage. Accordingly, an occupancy sensor 220 configured to implement the hiccupping signaling method may include a switched capacitor. The +30 Vdc (or other valued) hiccup pulse may be provided by charge stored in the capacitor. In this example, to limit the size and cost of the storage capacitor, the duration T1 of the hiccup pulse may be limited to a few hundred milliseconds or less. As with the drooping method, under the hiccupping method, an enhanced power pack 210 configured to detect and extract the movement signal monitors the signal line 150 for 100 ms upward excursions in the signal line voltage level above V2, for example, in the range between about +24 Vdc and +30 Vdc. By appropriately selecting the values of V2 and T1, for example, +24 Vdc and 100 ms as discussed above, compatibility with conventional power packs and relay modules can again be ensured. For example, the active circuitry included in conventional power packs between the signal line 150 and the relay 130 may shield the relay from overvoltage.

Figure 4:
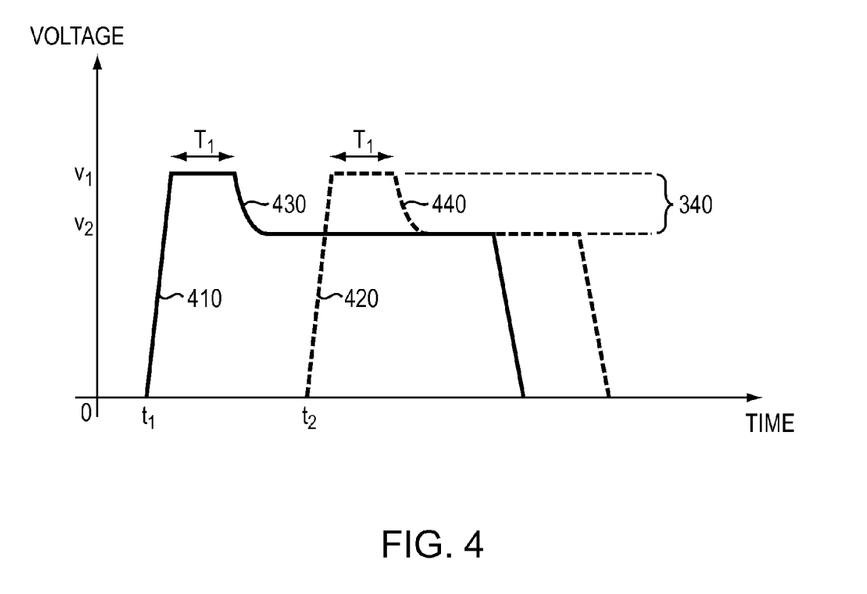
FIG. 4 is a signal diagram illustrating multiple occupancy signals provided on a common signal line according to aspects of the invention.

Referring to FIG. 4, there is illustrated a timing diagram showing an example of a tri-level occupancy signaling scheme with multiple occupancy signals received on the signal line 150. At time t1, a first occupancy sensor 220 detects motion and provides a first occupancy signal 410 on the signal line 150. Subsequently, at time t2, occurring during the occupancy portion of the first occupancy signal, the same or another occupancy sensor 220 detects motion and asserts a second occupancy signal 420 on the signal line 150. As discussed above, an enhanced power pack 210 monitors the signal line 150 to detect upward excursions in the signal voltage in the region 340 from the second voltage level V2 to the first voltage level V1. This principle of operation is the same whether the occupancy sensors are using the drooping signaling method or the hiccupping signaling method, with the only difference being the voltage level that the power pack is configured to detect. The movement portions 430, 440 of the occupancy signals 410, 420 respectively, together constitute a movement signal representative of movement within the monitored area. An occupancy sensor may repeat movement pulses responsive to detected movement during the "dwell time" or occupancy portion of its own occupancy signal or the occupancy signal from another occupancy sensor. The movement portions 430, 440 may be detected by the power pack 210 using any conventional voltage level detection mechanism, as would be understood by those skilled in the art, given the benefit of this disclosure. For example, the controller may include a comparator set to an appropriate reference level to detect voltages exceeding the reference level.

According to one embodiment, an occupancy sensor 220 configured for multi-level signaling using either the drooping or hiccupping method remains compatible with conventional power packs and legacy lighting control systems because the voltage levels V1 and V2 and the duration T1 can be selected such that the reporting of the occupancy signal to a conventional power pack is not disrupted. For example, as discussed above, in the drooping method, the first voltage level V1 is sufficiently high, and its duration T1 sufficiently long, to cause the power pack 210 to actuate the relay 130 to turn on the load 160, and the second voltage level V2 is sufficiently high to keep the load on. A conventional power pack not configured to detect the movement portions will therefore simply turn the load 160 on and off responsive to the occupancy signal as in conventional systems and does not respond to the movement pulse. The occupancy sensor therefore operates normally with a conventional power pack, but will also report movement to the power pack 210 that is configured with electronic circuitry to detect and interpret the upward excursions in the voltage on the signal line. Thus, according to at least one embodiment, the occupancy sensor 220 provides real-time movement information to a specially-configured power pack 210, but remains compatible with conventional power packs and may be used seamlessly with conventional power packs or with specialty power packs 210 which are able to make use of the additional information provided by the occupancy sensor.

Providing a signal/information representative of individual instances of movement, in addition to the occupancy status of the monitored area may provide significant benefits and advantages to a lighting control system. For example, in some instances it may be advantageous to have the timer that sets the period of occupancy (referred to as a "dwell timer") implemented external to the occupancy sensor, for example, in the power pack rather than in the occupancy sensor. In this example, the dwell timer may be responsive to the movement portion rather than the occupancy portion of the signal. An external dwell timer system may not operate correctly or reliably based on the conventional occupancy signal because repeated motion by the occupant could continually trigger the sensor, causing the signal to stay in the occupied state and therefore not supply updated information to the external timer. In contrast, if the occupancy sensor supplies a movement signal, the external dwell timer can be configured to receive the movement signal (or a signal representative of the movement signal) and the movement information can be used to generate the time delay to create the period of occupancy discussed above. In addition, in embodiments where the power pack is coupled to the network 240, supplying the movement signal (or information representative of the movement signal) to an external device via the network 480 may allow for remote adjustment/control of the timer or of another device. Furthermore, real-time monitoring of movement in areas can help building owners or managers understand facility utilization by monitoring movement patterns, and provide information that can be used to improve energy management in a building or area.

In the above-discussed embodiments, the occupancy sensor 220 is configured to provide a movement signal, in addition to the occupancy signal, to the power pack 210. In another embodiment, the occupancy sensor 220 is configured to provide a signal, in addition to the occupancy signal, representative of information other than movement. This additional information signal may be provided in the same way as discussed above for providing the movement signal using either the drooping or hiccupping methods. The additional information may include, for example, ambient light conditions at the occupancy sensor 220, diagnostic and/or maintenance information, for example, pre-set sensitivity levels of the occupancy sensor, whether the occupancy sensor is using ultrasonic or infrared detection, and whether the motion detected was major or minor movement (according to pre-set definitions).

According to another embodiment, a lighting control system includes a manual override switch coupled to either an occupancy sensor 220 or the power pack 210, as discussed further below. The manual override switch allows an occupant of the monitored area to override the timer-driven occupancy status of the area indicated by the occupancy sensor and force the lighting load 160 on or off. For example, if room occupants are engaged in low-movement activities such as reading or typing at a computer, the occupancy sensor 220 may time-out and turn off the room lighting prematurely. In one example, an occupant is warned that the lights are about to be turned off by an audible sounds (e.g., a beep) emitted by the occupancy sensor. The occupant may press the manual override switch, which is typically a wall-mounted switch, to override this pending action and keep the lights on. Similarly, when an energy-conscious occupant leaves a room, he/she may press the manual override switch to turn off the lights immediately rather than wait for the sensor-driven period of occupancy to end.

Conventional occupancy sensors do not include manual override switches, and are generally installed where they are not easily reachable by an occupant (for example on ceilings) such that incorporating a manual override switch is not practical. Thus, conventionally, manual override switches to be used with occupancy sensor/power pack lighting control systems require a specially-configured power pack having a separate manual override signaling port distinct from the signal line(s) used by the occupancy sensors. Each lighting-controlled area that has a manual override switch has an associated power pack with a manual override port to which the switch is directly wired. Thus, this type of conventional system requires a power pack with an additional port, and additional wiring for the manual override switch. Some other conventional lighting control systems include line voltage sensors referred to as "wall switch replacement sensors" which are self-contained, wall-mountable devices that are powered by 120-277 Vac line voltage and directly switch AC lighting loads. These devices are generally not connectable to a power pack and have no provisions for sensor-to-sensor networking. Accordingly, each device operates independently and controls its own connected load without coordination with other lighting control components.

Figure 5:
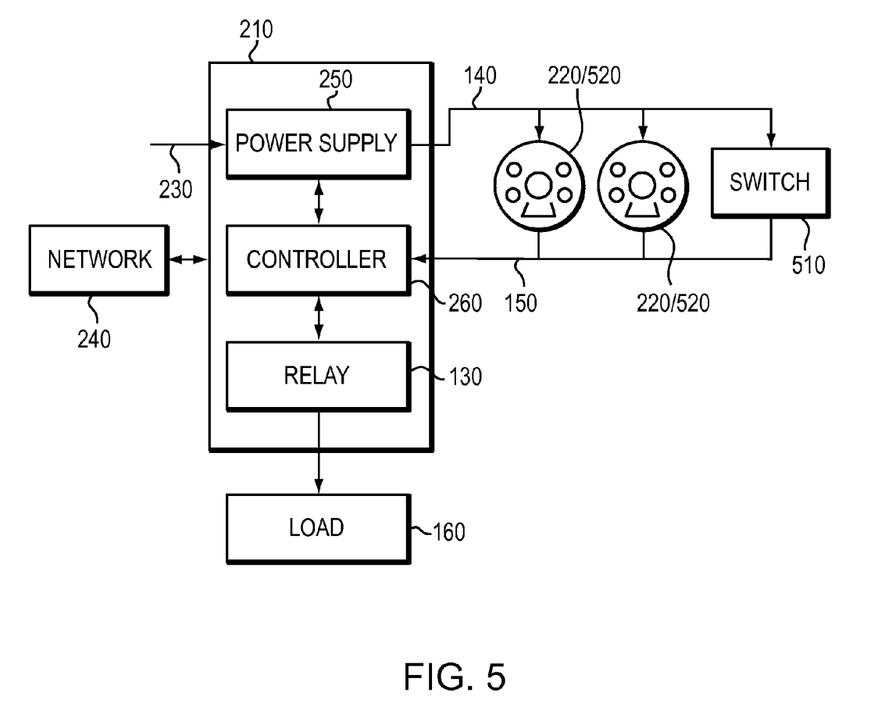
FIG. 5 is a block diagram of one example of a lighting control system including a manual override switch according to aspects of the invention.
Figure 6:
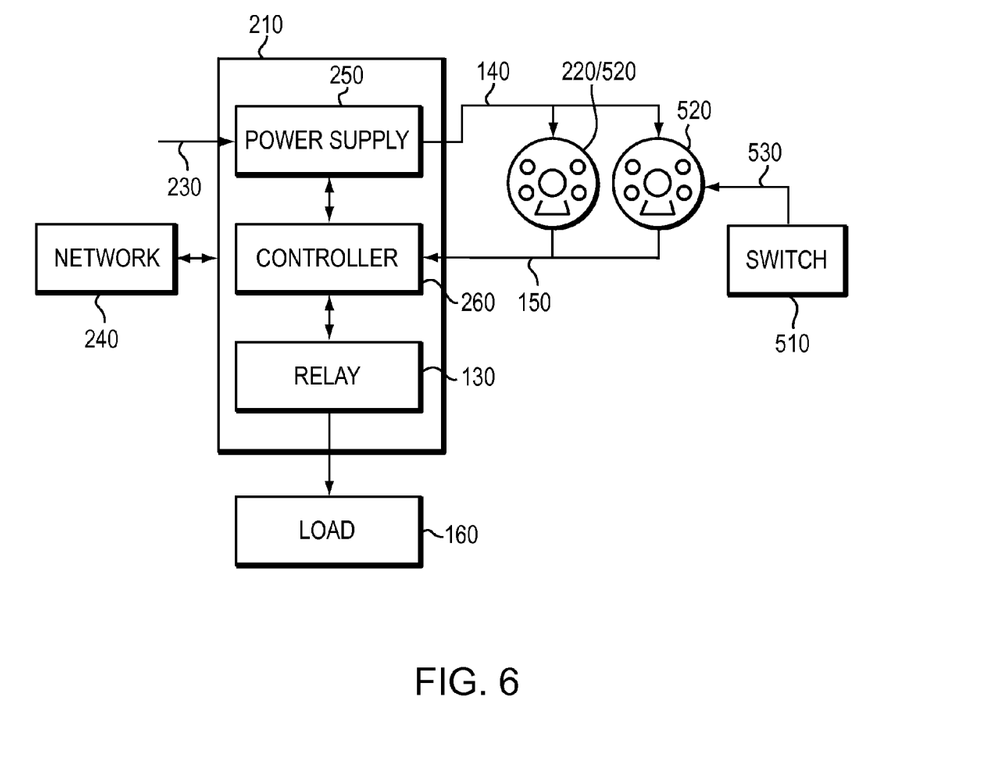
FIG. 6 is a block diagram of another example of a lighting control system including a manual override switch according to aspects of the invention.

According to one embodiment, a lighting control system including a power pack 210 and occupancy sensors 220 as discussed above also includes a manual override switch configured to operate with the occupancy sensor and power pack via the multi-valued signaling methods discussed above. Referring to FIG. 5, in the embodiment, a manual override switch 510 is connected to an enhanced occupancy sensor 520 via the signal line/bus 150. Alternatively, the manual override switch 510 may be connected to the occupancy sensor 520 via an override line 530, as illustrated in FIG. 6 and discussed further below. The manual override switch may generally be a wall-mountable switch, but may be mounted anywhere that is easily accessible to a user. The manual override switch 510 is configured to provide an override signal responsive to actuation by a user that is detected and interpreted by either the enhanced occupancy sensor 520 or power pack 210, as discussed further below, and used to force the lighting load 160 on or off.

Communication between the manual override switch 510, occupancy sensor 520 and power pack 210 can be accomplished in various ways. In one embodiment, a "tri-mode" capable occupancy sensor 520, that is, an occupancy sensor capable of implementing the conventional or "legacy" signaling method (i.e., a single-valued DC voltage used to signal occupancy) and the drooping and hiccupping signaling methods discussed above, is used to provide occupancy, movement and override information from the switch to the power pack 210. For example, the tri-mode occupancy sensor may be configured to provide an occupancy signal to the power pack 210 using either the legacy or drooping signaling methods. The tri-mode capable occupancy sensor is further configured to detect a switch signal provided on either the override line 530 or signal line 150 by the manual override switch 510. Responsive to detecting the switch signal, the tri-mode occupancy sensor 530 provides an override signal to the power pack 210 on the signal line 150 using the hiccupping signaling method, as discussed further below. In another embodiment, the occupancy sensors 220 are configured to signal the power pack 210 either the legacy or drooping signaling methods, and the manual override switch 510 is configured to signal the power pack 210 directly using a variant of the hiccupping method, as also discussed further below.

Referring to FIG. 5, in one example, the manual override switch 510 is configured to provide "hiccup" pulses on the signal line 150, and the occupancy sensor 520 is configured to detect these hiccup pulses. In this example, the occupancy sensor 520 is configured to signal the power pack 210 using the legacy or drooping methods, and will additionally monitor the signal line 150 to detect the hiccup pulses from the manual override switch 510. As discussed above, the hiccup pulses may short duration voltage pulses having a voltage level that is higher than the supply voltage or first voltage level V1, for example, +30 Vdc, such that the hiccup pulses are distinguishable from the occupancy signal. In one embodiment, the number of hiccup pulses generated by the manual override switch indicates whether the user intends for the lighting load 160 to be turned on or off. For example, when a single hiccup pulse is detected on the signal line 150 by the occupancy sensor 520, that sensor will renew its time counter and thereby initiate or extend the period of occupancy to having the lighting load 160 turn on or stay on. When two or more hiccup pulses are detected on the signal line 150 in rapid succession, the occupancy sensor will drive its time counter to completion, thereby ending its applied occupancy signal and causing the lighting load 160 to be turned off, provided no other occupancy sensor is holding the signal line high. Thus, the occupancy sensor 520 acts as a logical clearing house for signals generated by the manual override switch. The occupancy sensor 520 monitors the signal line 150 for the override signal, reformats the command (based on software-defined rules, for example), and sends the command to the power pack 210 over the signal line 150. The reformatted override signal adheres to legacy or droop signaling protocols.

In the embodiment illustrated in FIG. 5, the manual override switch 510 is configured to be connected to the signal line 150. In one example, the manual override switch 510 does not contain any active circuitry. Rather, the switch may use a momentary pushbutton switch that drives a capacitor, resistor and diode contained within the switch housing. When the pushbutton switch is pressed by an occupant, the energy stored in the capacitor is used to supply the hiccup pulse of, for example, +30 Vdc, consistent with the hiccupping method discussed above. The manual override switch may receive power to charge the capacitor from the power pack 210, for example by being connected to the supply line(s) 140, as illustrated in FIG. 5, or from another power source such as, for example, a battery (not shown). The occupancy sensors 520 monitor the signal line 150 and receive the hiccup pulses from the manual override switch 510. Upon decoding the hiccup pulses to determine whether the occupant intends for the lighting load 160 to be turned on or off, the occupancy sensor provides the turn-on or turn-off signal to the power pack 210 on the signal line 150 using either the legacy or drooping signaling method. If the tri-mode occupancy sensor 520 is configured to signal the power pack 210 using the drooping method, the lighting control system is able to both provide occupancy and movement (or other) information to the power pack 210 in addition to accommodating a manual override switch, thereby providing significant advantages over a conventional system.

In the above-discussed examples, the occupancy sensor is configured to detect and decode the switch signal (comprising one or more hiccup pulses) from the manual override switch 510 and pass the decoded information (override signal) to the power pack. In such a system, the power pack 210 need only be configured to detect and interpret the occupancy signal according to either conventional legacy signaling or the drooping method discussed above. In another embodiment, the power pack 210 is configured to detect and respond to the override signal from the manual override switch 510 directly, rather than have the occupancy sensor 520 "forward" the override information. In this example, the manual override switch 510 is coupled to the signal line 150, as illustrated in FIG. 5, and configured to provide the override signal in the form of one or more hiccup pulses, as discussed above. The occupancy sensors 220 may communicate with the power pack 210 again using either conventional legacy signaling or the drooping signaling method. The power pack 210 is configured to monitor the signal line 150 for upward excursions in the line voltage corresponding to the hiccup pulses, in the same manner discussed above for occupancy sensors 220 using the hiccupping signaling method. In this example, because the power pack 210 is directly receiving the override signal from the manual override switch, the power pack can turn off the lighting load 160 responsive to a "manual force to off" signal from the switch even if one or more occupancy sensors 220 are still applying their occupancy signals to the signal line 150.

Figure 7:
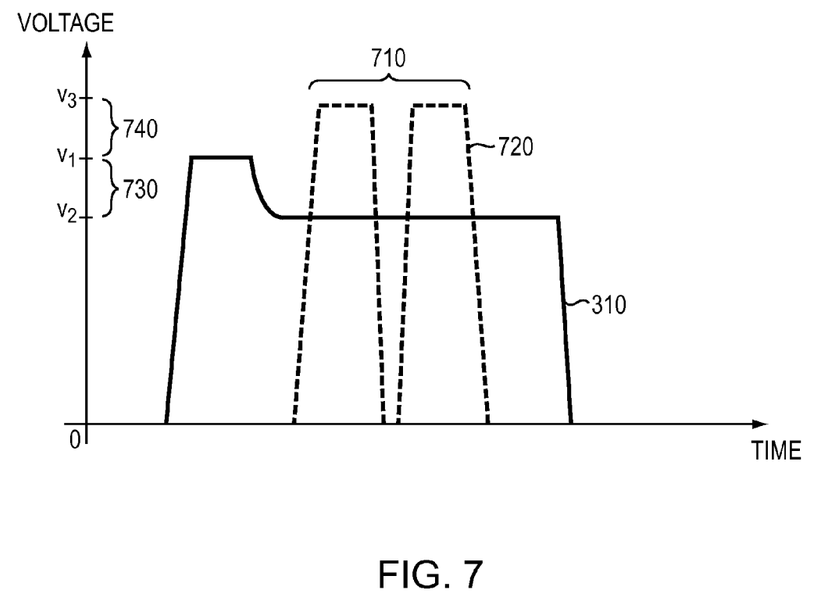
FIG. 7 is a signal diagram illustrating an override signal and a multi-level occupancy signal provided on a common signal line.

Referring to FIG. 7 there is illustrated a timing diagram showing an example of a tri-level signaling scheme accommodating an override signal from a manual override switch, directly or via a tri-mode capable occupancy sensor. In the illustrated example, the occupancy signal 310 is in accord with the drooping method discussed above. On the same signal line 150, the override signal 710 is applied, comprising one or more hiccup pulses 720 having a voltage level V3 that is higher than the voltage level V1. In one example, in which the supply voltage is approximately +24 Vdc, V1 corresponds approximately to the supply voltage, V2 is about +18 Vdc and V3 is about +30 Vdc. Each hiccup pulse 720 has a relatively short duration, for example, about 100 ms. The power pack 210 may be configured to monitor the signal line 150 for 100 ms upward excursions in the signal line voltage level between V2 and V1 (region 730) to detect and extract the movement signal, as discussed above. The power pack 210 may further be configured to additionally monitor the signal line 150 for 100 ms upward excursions in the signal line voltage level between V1 and V3 (region 740) to detect and extract the override signal. The power pack 210 may then control the lighting load 160 responsive to the occupancy signal 310 and override signal 710 based on software-defined rules.

Referring again to FIG. 5, in another embodiment, the manual override switch is connected to a tri-mode occupancy sensor 520 via the override line 530, rather than being connected to the signal line 150. In this embodiment, the manual override switch 510 provides an override signal to the occupancy sensor 520 on the override line 530. The occupancy sensor receives the override signal on the override line 530, reformats the override command, and sends the reformatted command to the power pack 210 over the signal line 150. In one example, the manual override switch 510 provides the override signal in the form of one or more voltage pulses, such as the hiccup pulses as discussed above. In this embodiment, however, since the override line 530 is separate from the signal line 150, the voltage level of the override signal need not be distinguishable from the occupancy signal voltage(s). The occupancy sensor 520 may provide the reformatted override command to the power pack 210 in a variety of different ways. For example, the occupancy sensor 520 may renew or complete its time counter to initiate, extend or terminate its occupancy signal, adhering to conventional or droop signaling, as discussed above. In another example, a tri-mode occupancy sensor 520 is configured to implement both the legacy or drooping signaling method and the hiccupping signaling method, as discussed above. In this example, the legacy or drooping method is used to communicate occupancy or occupancy and movement, respectively, and the hiccupping method is used to send the override command. The power pack 210 is configured to monitor the signal line to detect the movement and override information, as discussed above with respect to FIG. 7. This implementation has the advantage that the power pack may be able to detect and respond to the override signal from one occupancy sensor 520 even if another occupancy sensor 220/520 coupled to the same signal line 150 is applying its occupancy signal to the signal line.

Thus, according to various aspects and embodiments, a lighting control system may include an enhanced occupancy sensor 220 configured to implemented multi-valued signaling to provide additional information, superimposed on the usual occupancy signal, and a specialty power pack configured to detect and interpret the additional information. The lighting control system may also accommodate a manual override switch to allow an occupant to control lighting within an area without requiring the power pack to have a separate signal port or additional wiring. In addition, embodiments of the tri-mode operation discussed above may be used to achieve seamless integration of occupancy sensors with numerous building automation/control components and systems, not limited to manual override switches. For example, the pulsing mechanism discussed above that uses single pulsing and dual pulsing to signify a forced turn-on and turn-off, respectively, of the lighting load may be extended to use many closely-spaced pulses. Multiple closely-spaced pulses may be used to represent binary digital data, for example, that invokes other lighting control functions or provides diagnostic information.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. For example, any of the connections and/or communications links illustrated and discussed above may be wired or wireless links. Similarly, although the disclosure refers primarily to occupancy sensors, other types of sensors may be used in addition to or instead of occupancy sensors, such as, for example, light level sensors, motion sensors, fire and/or smoke detectors, water sensors, etc. Accordingly, the foregoing description and drawings are by way of example only, and the scope of the invention should be determined from proper construction of the appended claims, and their equivalents.

What is claimed is:

1. A lighting control system comprising:
    at least one occupancy sensor configured to provide on a signal line an occupancy signal representative of occupancy of an area, the occupancy signal being a DC voltage signal having a first non-zero voltage level maintained for a first predetermined duration followed by a second non-zero voltage level maintained for a second predetermined duration, the first non-zero voltage level being higher than the second non-zero voltage level; and
    a power pack coupled to the at least one occupancy sensor and configured to receive the occupancy signal on the signal line, the power pack comprising a load switching device configured to be coupled to a lighting circuit, and the power pack being configured to actuate the load switching device responsive to the occupancy signal;
    wherein the power pack is further configured to monitor the signal line to detect occurrences of the first non-zero voltage level.

2. The lighting control system as claimed in claim 1, wherein successive instances of the first non-zero voltage together form a movement signal, and further comprising:
    a timer coupled to the power pack and configured to receive information derived from the movement signal and to generate a time delay based on the information to set a period of occupancy for the area.

3. The lighting control system as claimed in claim 1, wherein the load switching device is a relay.

4. The lighting control system as claimed in claim 3, wherein the first non-zero voltage level is at least a rated coil voltage of the relay, and wherein the first predetermined duration is greater than a contact closure time of the relay.

5. The lighting control system as claimed in claim 3, wherein the second non-zero voltage level is higher than a specified coil drop-out voltage of the relay.

6. The lighting control system as claimed in claim 1, wherein the power pack is further configured to provide a DC power signal to the at least one occupancy sensor; and
    wherein one of the first non-zero voltage level and the second non-zero voltage level is approximately a voltage of the DC power signal.

7. The lighting control system as claimed in claim 6, wherein the second non-zero voltage is approximately the voltage of the DC power signal; and
    wherein the at least one occupancy sensor comprises a capacitor configured to provide the first non-zero voltage level.

8. The lighting control system as claimed in claim 1, wherein the first predetermined duration is approximately 100 milliseconds.

9. The lighting control system as claimed in claim 1, wherein the at least one occupancy sensor includes a plurality of occupancy sensors each coupled to the signal line and configured to monitor a selected area and to provide on the signal line the occupancy signal representative of occupancy of the respective selected area.

10. The lighting control system as claimed in claim 9, wherein the plurality of occupancy sensors includes a first occupancy sensor and a second occupancy sensor, and the system further comprising a manually-operable switch coupled to the first occupancy sensor and configured to provide a switch signal to the first occupancy sensor responsive to actuation of the switch.

11. The lighting control system as claimed in claim 10, wherein the first occupancy sensor is further configured to provide on the signal line an override signal corresponding to the switch signal; wherein the override signal comprises at least one pulse of a third non-zero voltage level, the third non-zero voltage level being higher than the first non-zero voltage level.

12. The lighting control system as claimed in claim 11, wherein the first non-zero voltage level is approximately +24Vdc and the third non-zero voltage level is approximately +30Vdc.

13. The lighting control system as claimed in claim 11, wherein the power pack is configured to actuate the load switching device responsive to the override signal.

14. The lighting control system as claimed in claim 1, further comprising a manually-operable switch coupled to the signal line and configured to provide on the signal line an override signal responsive to actuation of the switch, the override signal comprising at least one pulse of a third non-zero voltage level, the third non-zero voltage level being higher than the first non-zero voltage level.

15. The lighting control system as claimed in claim 14, wherein the first non-zero voltage level is approximately +24Vdc and the third non-zero voltage level is approximately +30Vdc.

16. The lighting control system as claimed in claim 1, wherein the at least one occupancy sensor is a passive infrared sensor or an ultrasonic sensor.

17. A method of controlling a lighting circuit, the method comprising:
    receiving on a signal line an occupancy signal representative of an occupancy status of an area, the occupancy signal including a first non-zero voltage level and a second non-zero voltage level, the first non-zero voltage level being higher than the second non-zero voltage level;
    monitoring the signal line to detect subsequent occurrences of the first non-zero voltage level;
    deriving movement information from detected occurrences of the first non-zero voltage level; and
    controlling the lighting circuit responsive to at least one of the occupancy signal and the movement information.

18. The method as claimed in claim 17, wherein controlling the lighting circuit includes actuating a relay to turn the lighting circuit on.

19. The method as claimed in claim 17, wherein the first non-zero voltage level is approximately +24Vdc and the second non-zero voltage level is approximately +18 Vdc.

20. The method as claimed in claim 17, wherein the first non-zero voltage level is approximately +30Vdc and the second non-zero voltage level is approximately +24 Vdc.

21. The method as claimed in claim 17, further comprising:
receiving on the signal line an override signal from a manually operable switch, the override signal including at least one pulse of a third non-zero voltage level higher than the first non-zero voltage level; and
wherein controlling the lighting circuit includes controlling the lighting circuit responsive to at least one of the occupancy signal, the movement signal and the override signal.

22. The method as claimed in claim 21, wherein controlling the lighting circuit includes actuating a relay to turn on the lighting circuit responsive to the override signal including one pulse.

23. The method as claimed in claim 21, wherein controlling the lighting circuit includes actuating a relay to turn off the lighting circuit responsive to the override signal including two pulses.

24. The lighting control system as claimed in claim 1, wherein the first non-zero voltage level is approximately +24Vdc; and wherein the second non-zero voltage level is approximately +18Vdc.

25. The lighting control system as claimed in claim 1, wherein the first non-zero voltage level is approximately +30Vdc; and wherein the second non-zero voltage level is approximately +24Vdc.

* * * * *